(12) United States Patent
Szeto et al.

(10) Patent No.: US 9,916,073 B1
(45) Date of Patent: Mar. 13, 2018

(54) ELECTRONIC DEVICE HAVING FORCE-BASED MODIFIABLE GRAPHICAL ELEMENTS AND METHOD OF OPERATING SAME

(71) Applicant: NANOPORT TECHNOLOGY INC., Markham (CA)

(72) Inventors: Timothy Jing Yin Szeto, Mississauga (CA); David Michael Lopez Reyes, Toronto (CA)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

(21) Appl. No.: 15/585,309

(22) Filed: May 3, 2017

Related U.S. Application Data

(60) Provisional application No. 62/447,406, filed on Jan. 17, 2017.

(51) Int. Cl.
   *G06F 3/0484* (2013.01)
   *G06F 3/041* (2006.01)

(52) U.S. Cl.
   CPC ........ *G06F 3/04845* (2013.01); *G06F 3/0414* (2013.01)

(58) Field of Classification Search
   USPC ................ 345/156, 173, 174, 169, 473–475; 715/702, 861, 777, 977
   See application file for complete search history.

(56) References Cited

U.S. PATENT DOCUMENTS

| 2002/0122029 | A1* | 9/2002 | Murphy .................. G06F 3/041 345/173 |
| 2010/0044121 | A1  | 2/2010 | Simon et al. |
| 2011/0261083 | A1* | 10/2011 | Wilson ..................... G06F 3/016 345/676 |
| 2013/0061170 | A1* | 3/2013 | Friedlander ........... G06F 3/0488 715/800 |
| 2013/0076646 | A1* | 3/2013 | Krah ...................... G06F 3/0414 345/173 |
| 2013/0162667 | A1* | 6/2013 | Eskolin ................. G06F 3/0488 345/619 |

(Continued)

FOREIGN PATENT DOCUMENTS

EP 2508960 A2 10/2012
WO 2016065482 A1 5/2016

*Primary Examiner* — Doon Chow
*Assistant Examiner* — Wendy Nicholas
(74) *Attorney, Agent, or Firm* — Norton Rose Fulbright Canada LLP; Alexandre Daoust (57) ABSTRACT

There is described a method of operating an electronic device having a housing and a user interface mounted to the housing. The user interface includes force sensor(s) on an edge of the housing and a display screen. The method includes displaying, on the display screen, a graphical element having an edge portion; receiving an input from the force sensor(s) on the edge, the input being a measured value of a force applied on the force sensor(s); and in response to said input received, modifying the graphical element on the display screen in a manner to move, to a destination position, the edge portion depending on a direction of movement of the edge portion, the destination position of the edge portion depending on an amplitude of the measured value.

16 Claims, 11 Drawing Sheets

(56) References Cited

U.S. PATENT DOCUMENTS

2013/0215061 A1\* 8/2013 Rydenhag ........... G06F 3/04883
                                                        345/173
2014/0125612 A1   5/2014  Park et al.
2014/0168135 A1   6/2014  Saukko et al.
2014/0317722 A1  10/2014  Tartz et al.
2016/0179338 A1   6/2016  Miller \* cited by examiner

ELECTRONIC DEVICE HAVING FORCE-BASED MODIFIABLE GRAPHICAL ELEMENTS AND METHOD OF OPERATING SAME

FIELD

The improvements generally relate to the field of electronic devices and more particularly to electronic devices having force sensitive user interfaces.

BACKGROUND

Conventional electronic devices such as mobile phones or tablet computers typically have a user interface that includes sensors (e.g., buttons) to receive user inputs. In some cases, these sensors can receive accidental inputs (e.g., pocket dials) that can cause the electronic device to perform an undesired function.

There remains room for improvement.

SUMMARY

In at least some cases, electronic devices include a user interface with one or more force sensors for measuring a force being applied on a corresponding one of the force sensors by one or more user touches, and a display screen to display graphical elements.

This disclosure relates to the modification of a graphical element displayed on the display screen in response to the measurement of a force being applied on a corresponding force sensor. The modification can include the movement of the graphical element in a manner which deforms it and/or changes its shape. Such modifiable graphical elements can help a user to confirm that the one or more touches have in fact been received by the electronic device, which may reduce the amount of accidental inputs and which may provide an enhanced feeling of unity with the electronic device. In some embodiments, the more the force measured increases, the more the graphical element is modified, until a given force threshold is exceeded, wherein a target function may be activated. In some other embodiments, the modification of the graphical element can be based on a confidence that the input received is actually desired by the user, rather than simply being an accidental input.

In accordance with one aspect, there is provided a computer-implemented method of operating an electronic device having a housing and a user interface mounted to the housing, the user interface including at least one force sensor on a first edge of two opposite edges of the housing and a display screen, the computer-implemented method comprising: displaying, on the display screen, a foreground graphical element having a first edge portion, and a background graphical element protruding from the first edge portion of the foreground graphical element; receiving a first input from the at least one force sensor on the first edge, the first input being a first measured value of a force applied on the at least one force sensor on the first edge; and in response to said first input received, modifying the foreground graphical element on the display screen in a manner to move, to a destination position, the first edge portion of the foreground graphical element and thereby one of reveal and hide a first corresponding portion of the background graphical element, depending on a direction of movement of the first edge portion, the destination position of the first edge portion depending on an amplitude of the first measured value.

In accordance with another aspect, there is provided an electronic device comprising: a housing having a first edge and a second edge opposite the first edge; a user interface mounted to the housing, the user interface including at least one force sensor on the first edge of the housing and a display screen; a processor housed within the housing and in communication with the user interface, the processor being configured to execute steps of: displaying, on the display screen, a foreground graphical element having a first edge portion, and a background graphical element protruding from the first edge portion of the foreground graphical element; receiving a first input from the at least one force sensor on the first edge, the first input being a first measured value of a force applied on the at least one force sensor on the first edge; and in response to said first input received, modifying the foreground graphical element on the display screen in a manner to move, to a destination position, the first edge portion of the foreground graphical element and thereby one of reveal and hide a first corresponding portion of the background graphical element, depending on a direction of movement of the first edge portion, the destination position of the first edge portion depending on an amplitude of the first measured value.

In accordance with another aspect, there is provided a computer-implemented method of operating an electronic device having a housing and a user interface mounted to the housing, the user interface including at least one force sensor sensitive at different locations on a first edge of two opposite edges of the housing and a display screen, the computer-implemented method comprising: displaying, on the display screen, a graphical element having a first edge portion; receiving a first input from the at least one force sensor on the first edge, the first input being a first measured value of one or more forces applied on the at least one force sensor on the first edge; and in response to said first input received, modifying the graphical element on the display screen in a manner to move, to a destination position, the first edge portion depending on an amplitude of the first measured value and on a first input confidence, the first input confidence being function of a first location offset between a location of the first input received and a first expected input location.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
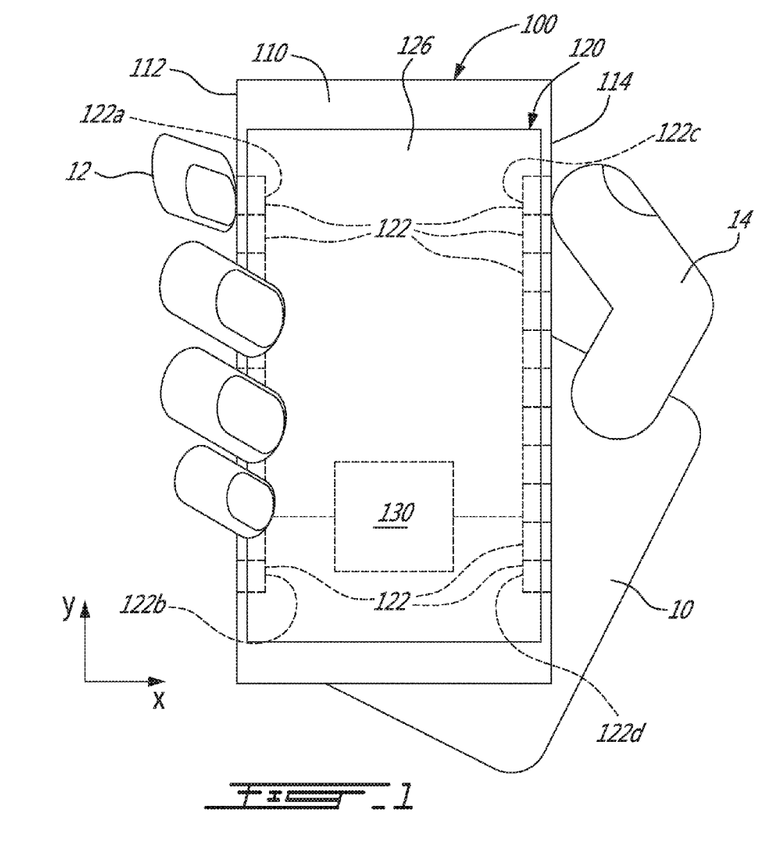
FIG. 1 is a front elevation view of an example of an electronic device shown held by a user, in accordance with an embodiment.

FIG. 1 shows an example of an electronic device 100 having a housing 110, a user interface 120 mounted to the housing 110, and a processor 130 housed within the housing 110 and in communication with the user interface 120. The electronic device 100 can be provided in the form of a smartphone, an electronic tablet or any other suitable electronic device.

As depicted, the housing 110 has two opposite edges 112, 114 which will be referred to as the first edge 112 and the second edge 114.

In this example, the user interface 120 includes one or more force sensors 122 for receiving user inputs, and a display screen 126 for displaying a graphical user interface. As can be understood, the term "force sensor" can be used interchangeably with the term "pressure sensor". Force sensors can thus be force sensitive, or equivalently, pressure sensitive.

More specifically, in this specific embodiment, force sensors 122 are disposed proximate the first edge 112 and on the second edge 114 of the housing 110. For example, force sensors 122 include force sensors 122a and 122b disposed proximate the first edge 112 and force sensors 122c and 122d disposed proximate the second edge 114. An example of an electronic device having such force-sensitive sides is described in International Patent Publication No. WO 2016/065482, the contents of which are incorporated by reference herein. It is understood, however, that in some other embodiments, only one of the first and second edges 112 and 114 can be provided with force sensor(s).

The force sensors 122 allow a user to enter inputs while gripping the electronic device 100 (e.g., with one hand 10), by way of forces applied at locations of any one of the force sensors 122 of the first and second edges 112 and 114. As depicted, the inputs can be entered by the same hand 10 that grips the electronic device 100.

For instance, as shown in FIG. 1, the index finger 12 of hand 10 applies a force on the force sensor 122a which is located at an upper portion of the first edge 112 while the thumb 14 of hand 10 applies a force on the force sensor 122c which is located at an upper portion of the second edge 114.

In the embodiment shown, each of the first and second edges 112 and 114 of the electronic device 100 has a plurality of force sensors 122. However, in some other embodiments, the electronic device has a first force sensor sensitive along the first edge and a second force sensor sensitive along the second edge. In these embodiments, each of the first and second force sensors provides an indication of measured force at particular locations along a corresponding one of the first and second edges.

As will be described below, when a force is applied on any one of the force sensors 122, the processor 130 is configured to modify the graphical user interface being displayed on the display screen 126 by moving a graphical element of the graphical user interface. Examples of such moving can encompass deforming a graphical element, changing the shape of a graphical element and/or removing the graphical element.

Accordingly, the graphical user interface can respond to forces applied by a user's hand by creating an animated motion effect that resembles a piece of material moving in response to the applied forces. In some embodiments, the animated motion effect can resemble an elastic material deforming to transition between a stressed state and a relaxed state in response to the applied forces.

Examples described with reference to FIGS. 2-9 show a graphical user interface 200 of the electronic device 100 responding to different forces applied on one or more of the force sensors 122 of the electronic device 100 of FIG. 1. Reference to components of the electronic device 100 of FIG. 1 will thus be made throughout the following description.

Figure 2:
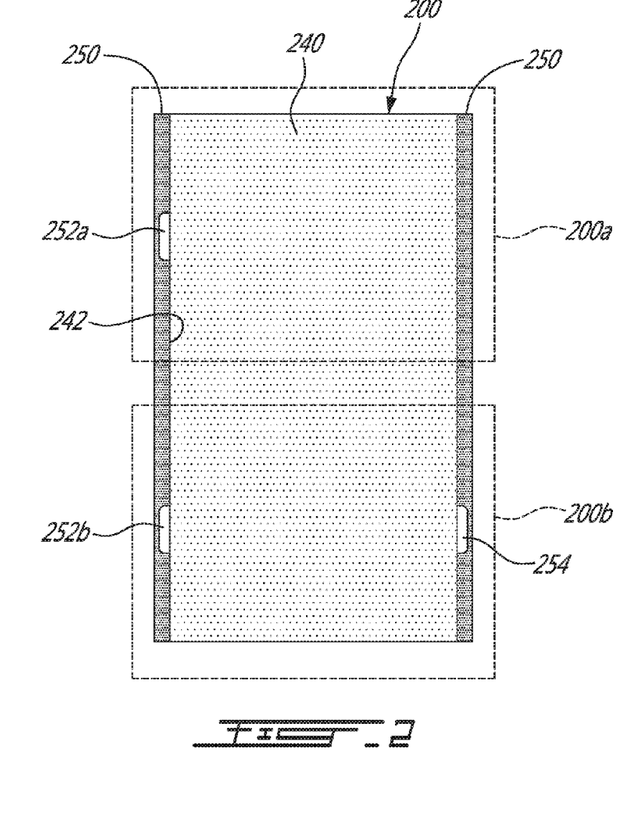
FIG. 2 is a schematic view of an example of a graphical user interface that can be displayed by the electronic device of FIG. 1, in accordance with an embodiment.

As depicted in FIG. 2, the graphical user interface 200 includes a foreground graphical element 240 having a first edge portion 242 and a background graphical element 250 which protrudes from the first edge portion 242 of the foreground graphical element 240. In this way, one can see both the foreground graphical element 240 and a portion of the background graphical element 250. More specifically, one can see the background graphical element extend from underneath and beyond the front graphical element towards the edge of the electronic device. In some embodiments, the first edge portion 242 can be said to be a moveable graphical element or a deformable graphical element.

During operation of the electronic device 100, graphical buttons, wallpaper, applications, etc. can be displayed as part of the foreground graphical element 240. In this example, the foreground graphical element 240 spans the entire length of the graphical user interface 200. However, in some other embodiment, the foreground graphical element 240 spans a portion of the graphical user interface 200.

The background graphical element 250 can include one or more graphical buttons indicating regions where a user can apply a force to provide user input. For instance, the background graphical element 250 includes 3 graphical buttons, i.e. first and second spaced-apart graphical buttons 252a and 252b on a left-hand side of the graphical user interface 200, and a third graphical button 254 on a right-hand side of the graphical user interface 200. As can be seen, the graphical buttons 252a, 252b and 254 are partially hidden by the foreground graphical element 240.

In this example, the first graphical button 252a is displayed at a location adjacent the force sensor 122a on the first edge 112 of the electronic device 100, the second graphical button 252b is displayed at a location adjacent the force sensor 122*b* on the first edge 112, and the third graphical button 254 is displayed at a location adjacent the force sensor 122*d* on the second edge 114.

As can be understood, the graphical user interface 200 shown in FIG. 2 is an example only. Other graphical user interfaces can be used in other embodiments.

For example, the force sensor 122*a* is configured to transmit, to the processor 130, a first input in response to a force applied by the user at the location of the force sensor 122*a*. In this case, the first input is a first measured value of the force applied on the force sensor 122*a*.

In response to the reception of the first input, the processor 130 is configured to modify the graphical user interface 200 being displayed on the display screen 126.

More specifically, when the processor 130 receives the first input from the force sensor 122*a*, the processor 130 is configured to modify the foreground graphical element 240 on the display screen 126 in a manner to move, to a destination position, the first edge portion 242 of the foreground graphical element 240 and thereby reveal or hide a corresponding portion of the background graphical element 250, depending on a direction of movement of the first edge portion 242.

The destination position of the first edge portion 242 depends on an amplitude of the first measured value. Accordingly, when the amplitude of the first measured value increases, the first edge portion 242 moves away from the first edge 112, namely, in the direction of the force applied, and reveals a previously hidden portion of the corresponding graphical button of the background graphical element 250. In this way, when such a force is applied, the previously hidden portion is revealed to show a graphical icon, which graphically represents the function associated with activating the corresponding graphical button. In contrast, when the amplitude of the first measured value decreases, the first edge portion 242 moves towards the first edge 112 and hides the corresponding portion of the background graphical element 250. In this way, as a force applied on the first edge 112 increases, the first edge portion 242 moves away from the first edge 112 such that an increased portion of the first graphical button 252*a* becomes visible, and vice-versa.

FIG. 2 shows the graphical user interface 200 when no force is applied on the force sensor 122*a*. In this case, the processor 130 receives a first measured value having a null amplitude $f_0$, i.e. equal to zero, and displays the first edge portion 242 of the foreground graphical element 240 adjacent to the first edge 112 of the housing 110 and parallel to the first edge 112. In this case, the foreground graphical element 240 is not modified, and the first edge portion 242 remains parallel to the first edge 112. Accordingly, the first edge portion 242 is not distinguishable from the foreground graphical element 240 when no force is applied in this example.

Figure 3:
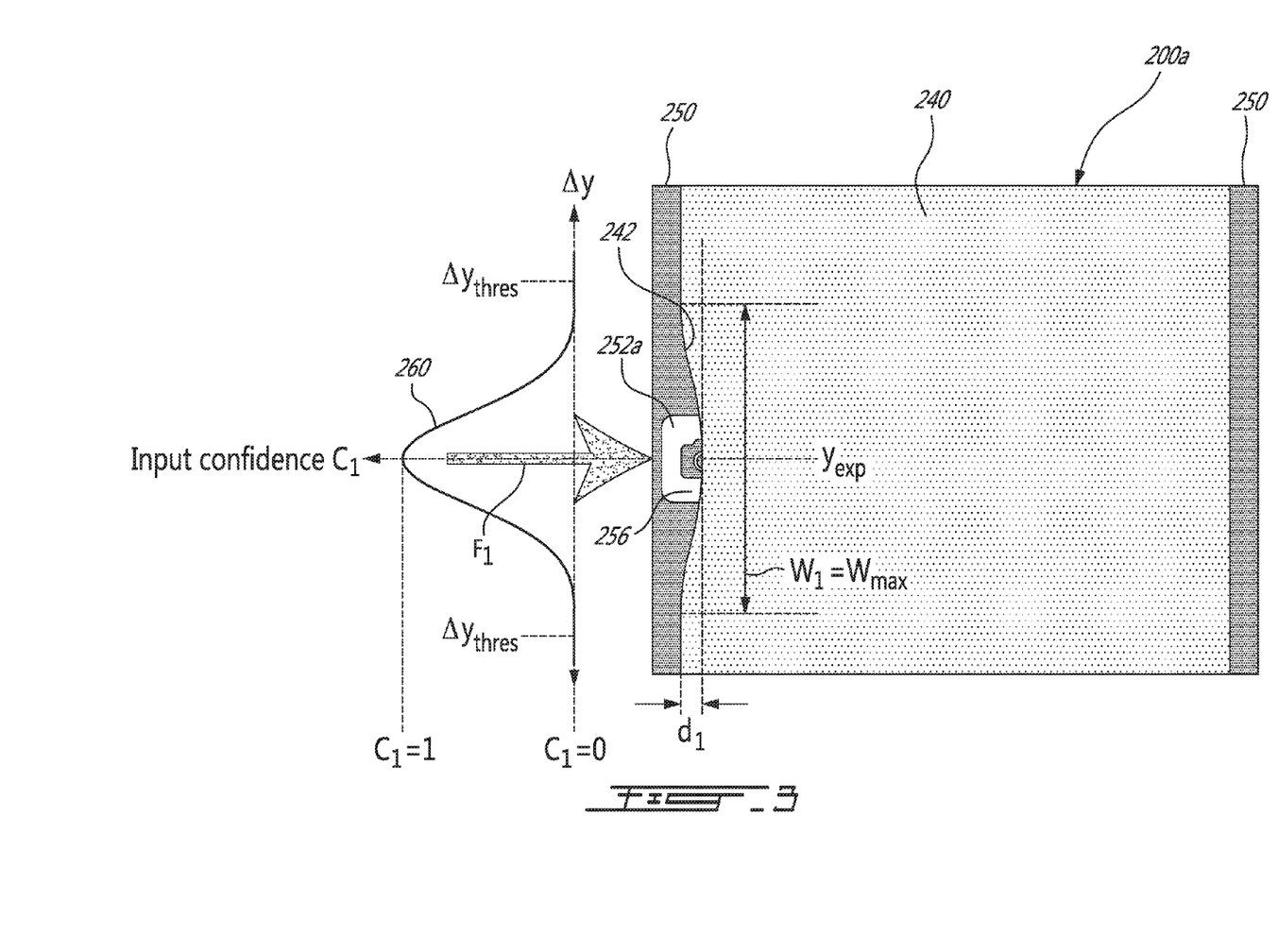
FIG. 3 is a schematic view of a first portion of the graphical user interface of FIG. 2 when a force of a magnitude $F_1$ is applied on a first edge of the electronic device of FIG. 1, in accordance with an embodiment.

FIG. 3 shows an enlarged view of a first portion 200*a* of the graphical user interface 200 of FIG. 2 when a first force of magnitude $F_1$ is applied on the force sensor 122*a*. In this case, the processor 130 receives a first measure value having a non-null, first amplitude $f_1$. Accordingly, the processor 130 modifies the foreground graphical element 240 on the display screen 126 in a manner to move, to a first destination position $d_1$, the first edge portion 242 of the foreground graphical element 240 and thereby revealing a corresponding portion 256 of the background graphical element 250. In this case, the magnitude of the movement of the first edge portion 242 is proportional to the first amplitude $f_1$. A graphical animation can show the movement of the first edge portion 242 between the first destination position $d_1$ and the second destination position $d_2$.

Figure 4:
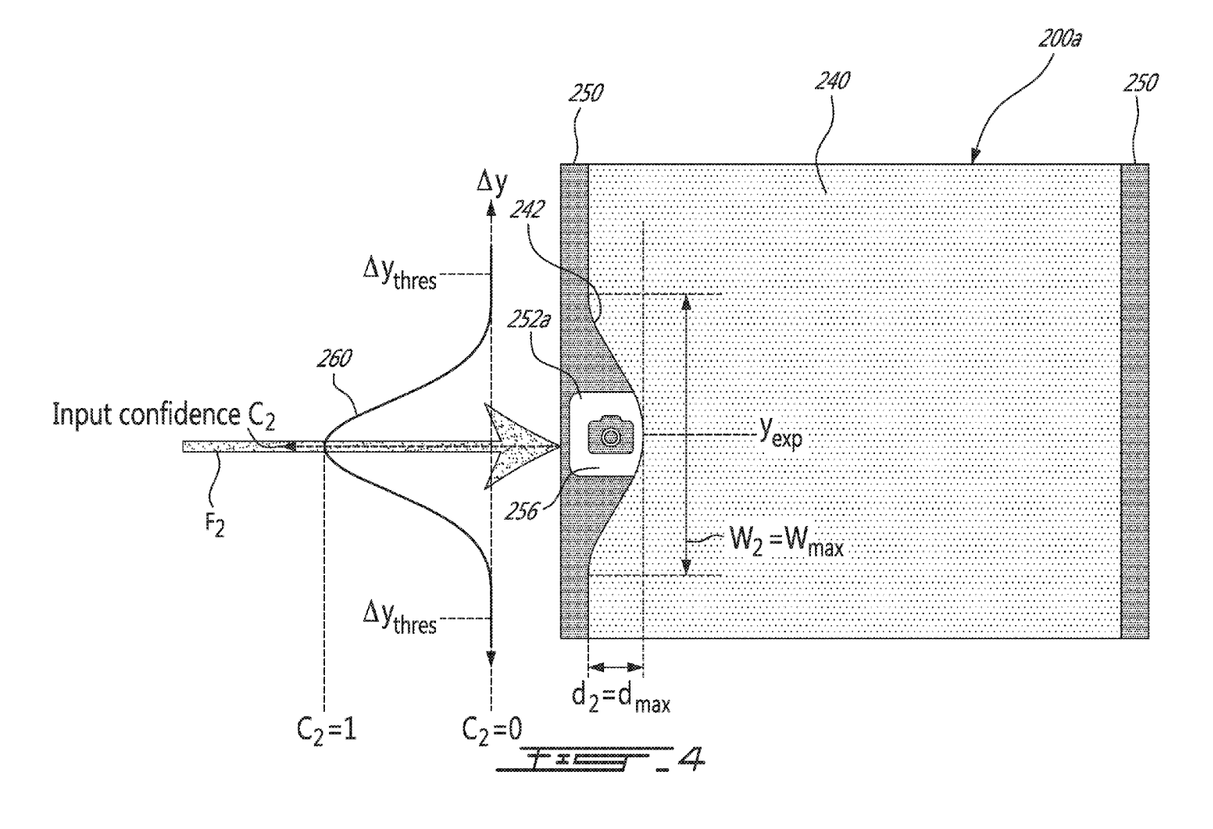
FIG. 4 is a schematic view of the first portion of the graphical user interface of FIG. 2 when a force of a magnitude $F_2$ is applied on the first edge of the electronic device of FIG. 1, in accordance with an embodiment.

FIG. 4 shows an enlarged view of the first portion 200*a* of the graphical user interface 200 of FIG. 2 when a second force of magnitude $F_2$ is applied on the force sensor 122*a*, the magnitude $F_2$ being greater than the magnitude $F_1$ ($F_2>F_1$). In this case, the processor 130 receives a first measured value that has a non-null, second amplitude $f_2$, which is proportionally greater than the first amplitude $f_1$. Accordingly, the processor 130 modifies the foreground graphical element 240 on the display screen 126 in a manner to move, to a second destination position $d_2$ farther away from the first edge 112 than the first destination $d_1$, the first edge portion 242 of the foreground graphical element 240 and thereby further revealing the corresponding portion 256 of the background graphical element 250.

In some embodiments, the destination position of the first edge portion 242 reaches a maximal recessed destination position $d_{max}$ when the amplitude of the first measured value exceeds a given threshold amplitude $f_{th}$. For instance, in the example illustrated in FIG. 3, the second amplitude $f_2$ of the first measured value exceeds the given threshold amplitude ($f_2>f_{th}$) so the second destination position $d_2$ coincides with the maximal recessed destination position $d_{max}$. In this way, even if a force of greater magnitude than the magnitude $F_2$ is applied on the force sensor 122*a* on the first edge 112, the first edge portion 242 will not be moved farther than the second destination position $d_2$.

In some embodiments, the processor 130 activates a target function of the electronic device 100 when the amplitude of the first measured value exceeds a given threshold amplitude $f_{th}$.

For instance, as depicted in FIG. 4, the portion 256 of the background graphical element 250 that is revealed by the first edge portion 242 includes the first graphical button 252*a*. In this specific case, the first graphical button 252*a* is a camera icon which is generally associated with a camera function of the electronic device. Accordingly, the processor 130 activates a camera function of the electronic device 100 in response to a first measured value having an amplitude exceeding the given threshold amplitude $f_{th}$. Other functions can be activated in this manner.

In some embodiments, when the function of the first graphical button 252*a* is activated, the first graphical button 252*a* slightly moves in a direction of the first edge 112 to confirm to the user that the function has actually been activated. In other embodiments, the first graphical button 252*a* can jiggle when it is activated. Alternatively, the movement of the first graphical button 252*a* can emulate the movement of a button which is pressed against an elastic element such as a spring.

As exemplified in FIGS. 3 and 4, the first edge portion 242 moves away from the first edge 112 when the amplitude of the first measured value increases. More specifically, in this example, the first edge portion 242 does so while maintaining a shape which resembles the shape of some real-world elastic material receiving a force. In this case, the shape is provided in the form of a Gaussian-shaped curve, but any other suitable curve (e.g., a parabolic curve) can also be used. As depicted, the Gaussian-shaped curve points away from the first edge 112 and has a magnitude that is proportional to the amplitude of the first measured value. Accordingly, the magnitude of the Gaussian-shape curve of the first edge portion 242 increases when the amplitude of the first measured value increases, and the magnitude of the Gaussian-shape curve of the first edge portion 242 decreases when the amplitude of the first measured value decreases. It can also be noticed that the Gaussian-shape curve has a peak position which follows the destination position of the first edge portion 242.

In the case where the movement of the first edge portion 242 is a deformation, each deformation has an associated degree of deformation after the animated motion effect finishes. In this example, the degree of deformation can be defined by a destination position $d_i$ and a width $w_i$ as shown in FIGS. 3 and 4. In some embodiments, the deformation recedes once the force being applied by the user is released, having a graphical effect of the depicted elastic material returning to a relaxed state and the first edge portion 242 returning to its original destination position as shown in FIG. 2. In this way, the first edge portion 242 can be moved from a relaxed state in which the first edge portion 242 is at its original destination position to a stressed state in which the first edge portion 242 is at the first destination position $d_1$. Meanwhile, the first edge portion 242 can be said to be in a transition state when transitioning between the relaxed state and the stressed state. The transition state can include a movement of the first edge portion 242 in response to a force which can be similar to how a flexible material would change its shape upon receiving such a force. For instance, the movement can deform a straight edge into a curved edge, or vice versa, and therefore change the shape of the initial, undeformed first edge portion 242. Once deformed, the first edge portion 242 can be said to be in a stressed state (e.g., compressed or stretched), and once the force is released, the first edge portion 242 can revert to its initial shape or relaxed state.

The location of the deformation is determined according to a force applied by a user's hand 10 (e.g., index finger 12 and/or thumb 14). Multiple deformations can be shown if forces are applied at multiple locations along either one or both of the first and second edges 112 and 114 of the electronic device 100.

As discussed, the degree of deformation may be determined according to a magnitude $F_i$ of the force applied at a given location. As depicted, the degree of deformation may also be determined according to a confidence that the force corresponds to an intended user input (e.g., rather than accidental user input or forces associated with a user holding the electronic device 100 during operation), which can be referred to as an "input confidence $c_i$".

FIGS. 3 and 4 depict graphs of input confidence functions 260 for determining the input confidence $c_1$ and $c_2$, respectively. Broadly described, the input confidence $c_i$ can be determined according to the difference(s) between a location $y_i$ of an input and one or more pre-defined expected input locations $y_{exp}$ such as a location of any one of the graphical buttons 252a, 252b or 254. Such difference(s) are referred to as location offset $\Delta y_i$, wherein $\Delta y_i = y_i - y_{ref}$. The input confidence $c_i$ is a function which typically varies between 0 and 1. The y-axis of these graphs represents location offset $\Delta y_i$ and the x-axis intersects the center of a corresponding graphical button, representing the expected input location $y_{exp}$. The pre-defined expected input locations $y_{exp}$ can be defined programatically, and can change depending on which software of the electronic device is being executed. For instance, different applications can pre-define different graphical buttons and/or set the graphical icon depicted on the graphical button.

As shown, the input confidence $c_i$ is highest (e.g., equal to 1) when the location offset $\Delta y_i$ is null, i.e. when the location $y_i$ of the input is equal to the expected input location $y_{exp}$ (e.g., the center of a graphical button). Moreover, the input confidence $c_i$ decreases as the location offset $\Delta y_i$ deviates from zero, i.e. when the location of the input deviates from the expected input location $y_{exp}$. In this example, the relationship between the input confidence $c_i$ and the location offset $\Delta y_i$ is represented by a Gaussian function. However, in practice, the input confidence $c_i$ can be set to 0 when the location offset $\Delta y_i$ is greater than a location offset threshold $\Delta y_{thres}$. Other functions, especially functions that have a maximum at its center and approach zero at tails, can also be used.

For instance, the destination position $d_i$ can be calculated to be proportional to the magnitude of the force, while the width $w_i$ can be calculated to be proportional to the input confidence $c_i$, as follows:

$$d_i = A \cdot f_i \text{ when } f_i < f_{th} \text{ or } d_i = d_{max} \text{ when } f_i > f_{th}, \text{ and} \qquad (1)$$

$$w_i = B \cdot c_i + C \text{ when } c_i < 1 \text{ or } w_i = w_{max} \text{ when } c_i = 1, \qquad (2)$$

where $f_i$ represents the amplitude of the measured value as measured by a corresponding one of the force sensors 122, $c_i$ represents the input confidence as described above, and A, B and C each represent a constant parameter, which can be pre-defined and stored on a memory of the electronic device 100. Each of $d_i$ and $w_i$ can have dimensional units such as pixels or mm.

Parameter A represents a conversion rate from force (e.g., Newtons) to mm or pixels (e.g., 2 mm/1N), parameter B represents a scaling factor for conversion of input confidence to deformation width (e.g., 5 mm), and parameter C represents a minimum deformation width (e.g., 3 mm).

Accordingly, in the example shown in FIG. 3, the first destination position $d_1$ is given by $d_1 = A \cdot f_1$ and the first edge portion 242 has a first width $w_1$ given by $w_1 = B \cdot c_1 + C = w_{max}$, wherein the input confidence $c_1$ is maximal (e.g., $c_1 = 1$) as the location offset $\Delta y$ is null.

In the example shown in FIG. 4, the second destination position $d_2$ is given by $d_2 = A \cdot f_2$ and the first edge portion 242 has a second width $w_2$ given by $w_2 = B \cdot c_2 + C = w_{max}$, wherein the input confidence $c_2$ is maximal (e.g., $c_2 = 1$) as the location offset $\Delta y$ is null also in this example. As can be expected, the second destination position $d_2$ is greater than the first destination position $d_1$, and $w_1$ is equal to $w_2$. In this embodiment, the second destination position $d_2$ is the maximal recessed destination position $d_{max}$ because the amplitude $f_2$ of the first measured value exceeds the given threshold value $f_{th}$.

Figure 5:
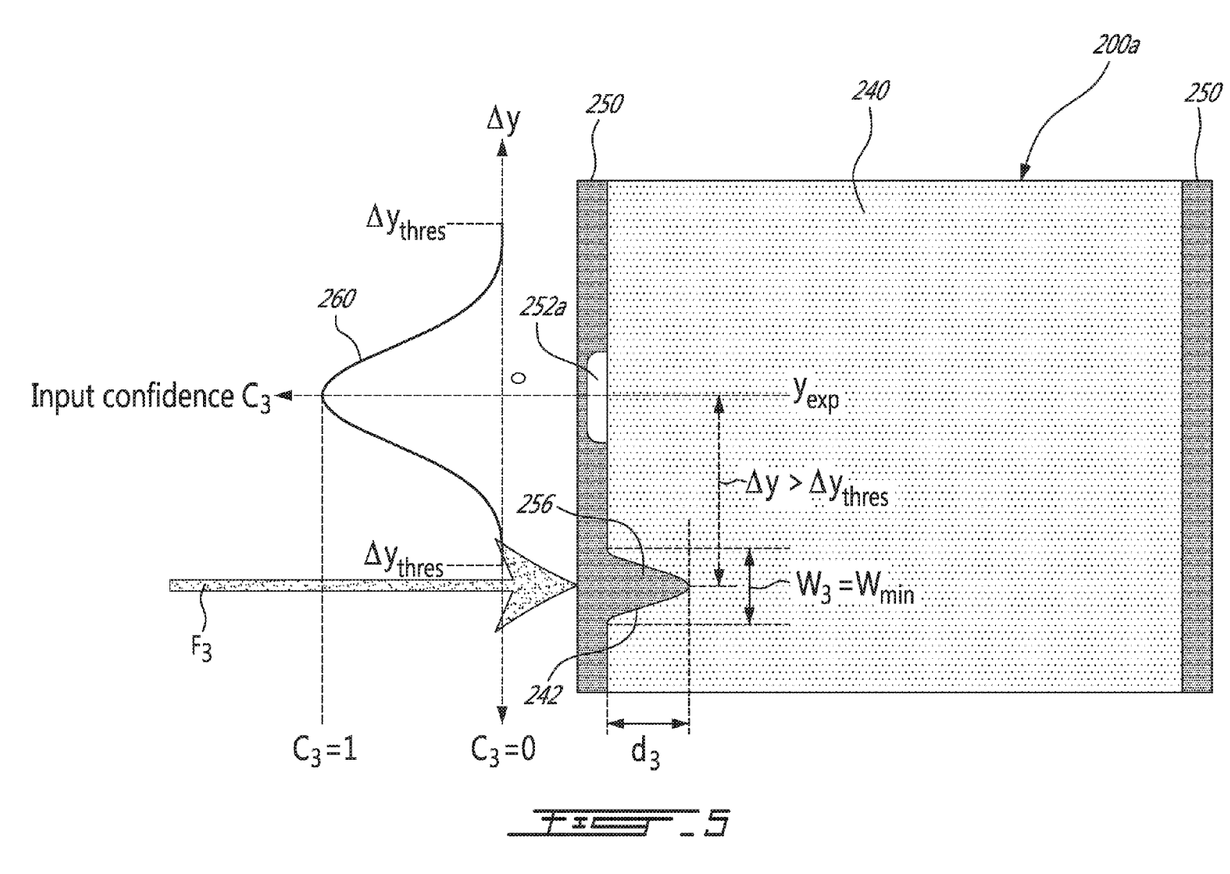
FIG. 5 is a schematic view of the first portion of the graphical user interface of FIG. 2 when a force of a magnitude $F_3$ is applied on the first edge of the electronic device of FIG. 1, in accordance with an embodiment.

FIG. 5 shows an enlarged view of a first portion 200a of the graphical user interface 200 of FIG. 2 when a third force of magnitude $F_3$ is applied on one of the force sensors 122a and 122b on the first edge 112, but spaced from a location of the force sensor 122a. In this example, the first edge portion 242 of the foreground graphical element 240 is moved at a location where the input is received based on the plurality of first measured values received from the force sensors 122a and 122b on the first edge 112.

In this case, the processor 130 receives a first measured value having a non-null, third amplitude $f_3$, which is similar to the second amplitude $f_2$. Accordingly, the processor 130 modifies the foreground graphical element 240 on the display screen 126 in a manner to move, to a third destination position $d_3$ away from the first edge 112, the first edge portion 242 of the foreground graphical element 240 and thereby revealing a corresponding portion 256 of the background graphical element 250 located where the first input has been received. As described above, in this example, the third destination position $d_3$ is given by $d_3 = A \cdot f_3$.

In this example, the first edge portion 242 has a third width $w_3$ given by $w_3 = B \cdot c_3 + C = C$, wherein the input confidence $c_3$ is minimal (e.g., $c_3=0$) as the location offset $\Delta y$ is greater than a given location offset threshold $\Delta y_{thres}$, $\Delta y > \Delta y_{thres}$.

Figure 6:
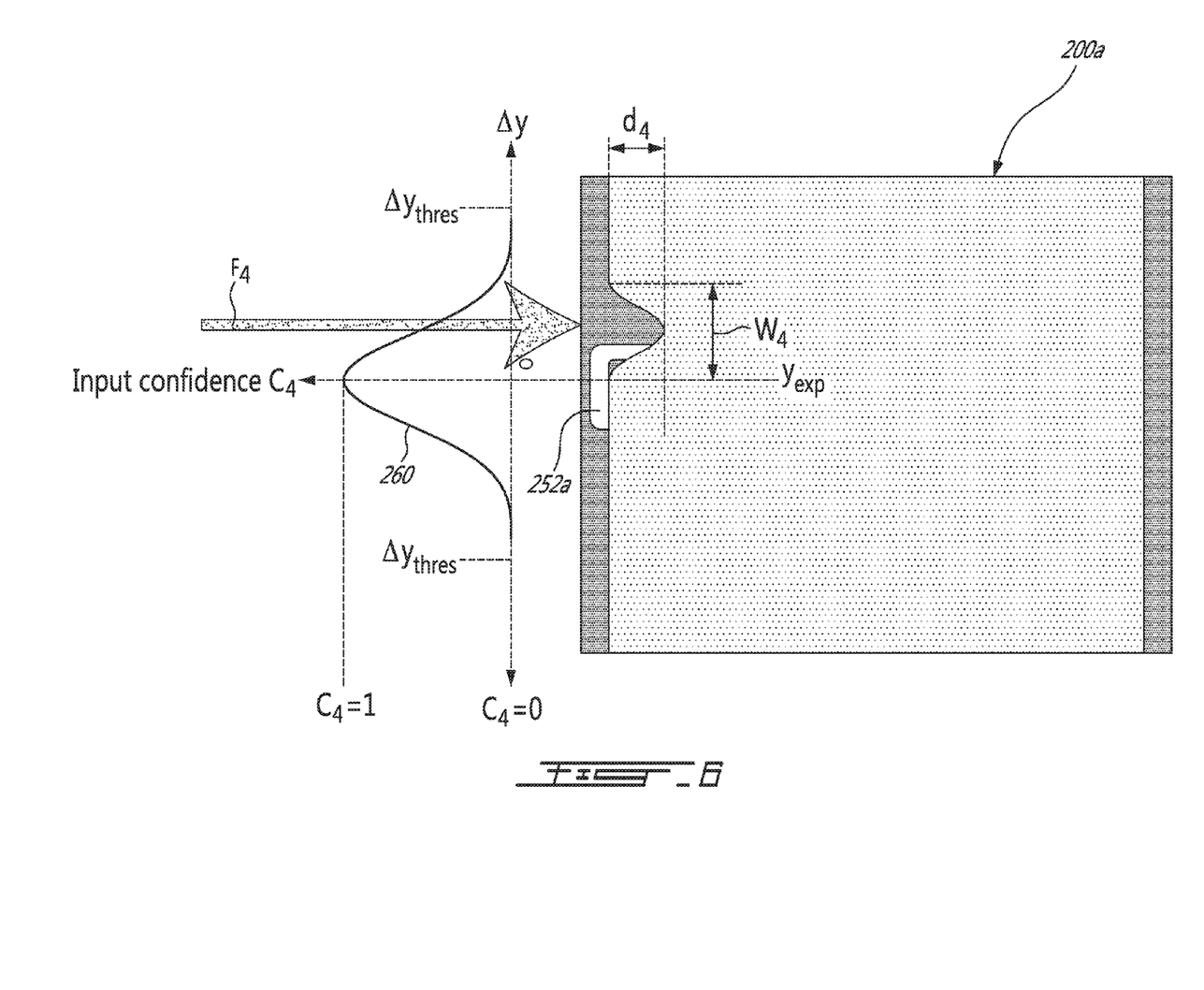
FIG. 6 is a schematic view of the first portion of the graphical user interface of FIG. 2 when a force of a magnitude $F_4$ is applied on the first edge of the electronic device of FIG. 1, in accordance with an embodiment.

FIG. 6 shows an enlarged view of a first portion 200a of the graphical user interface 200 of FIG. 2 when a fourth force of magnitude $F_4$ is applied on one of the force sensors 122a and 122b on the first edge 112, but spaced from a location of the force sensor 122a. In this example, the first edge portion 242 of the foreground graphical element 240 is moved at a location where the input is received based on the plurality of first measured values received from the force sensors 122a and 122b on the first edge 112.

In this case, the processor 130 receives a first measured value having a non-null, third amplitude $f_4$. Accordingly, the processor 130 modifies the foreground graphical element 240 on the display screen 126 in a manner to move, to a fourth destination position $d_4$ away from the first edge 112, the first edge portion 242 of the foreground graphical element 240 and thereby revealing a previously hidden portion 256 of the background graphical element 250 located where the first input has been received. Again, the fourth destination position $d_4$ is given by $d_4 = A \cdot f_4$ in this example. As shown in FIG. 6, revealing only a top portion of the graphical button 252a provides a visual cue to the user that the location of the force should be lowered if the user intends to activate graphical button 252a.

In this example, the first edge portion 242 has a fourth width $w_4$ given by $w_4 = B \cdot c_4 + C$, wherein the input confidence $c_4$ is between 0 and 1 (e.g., $c_4 \approx 0.5$) as the location offset $\Delta y$ is between 0 and the location offset threshold $\Delta y_{thres}$.

FIGS. 3-6 show a simplified graphical user interface having only the first graphical button 252a. However, in practice, a graphical user interface is likely to have several graphical buttons, such as the second and third graphical buttons 252b and 254 shown in FIG. 2.

Figure 7:
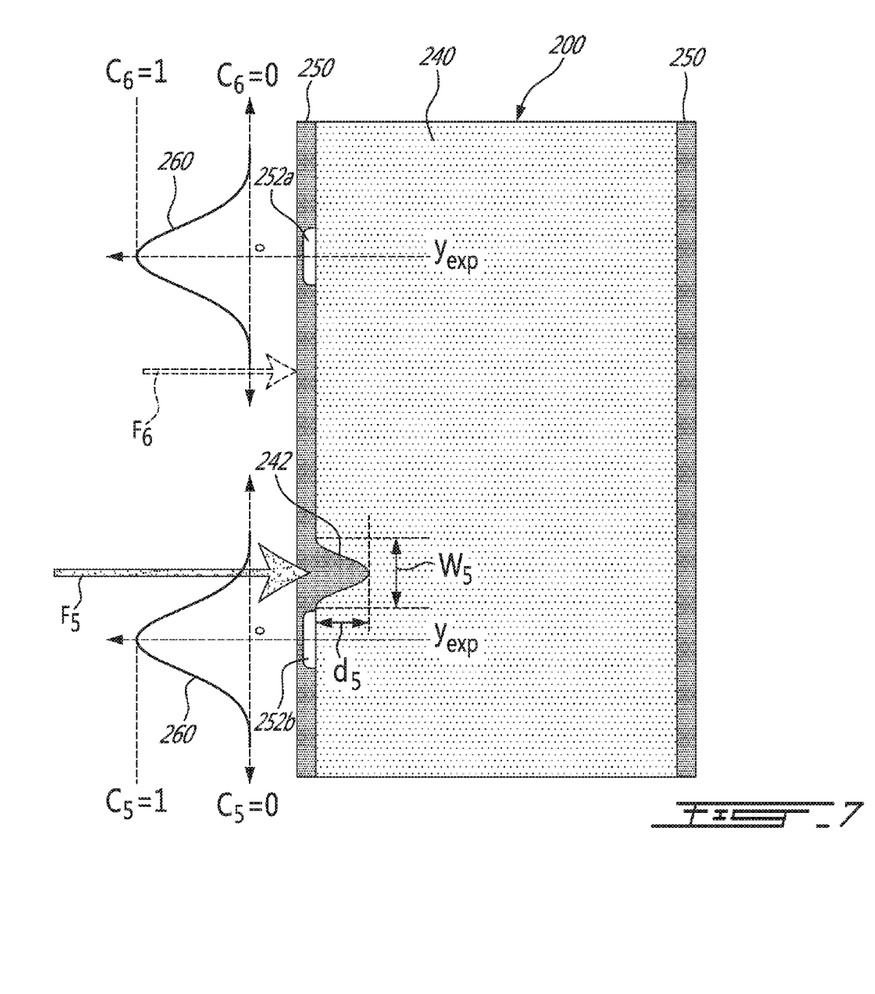
FIG. 7 is a schematic view of the graphical user interface of FIG. 2 when a force of a magnitude $F_5$ is applied on the first edge of the electronic device of FIG. 1, in accordance with an embodiment.

FIG. 7 shows the graphical user interface 200 of FIG. 2 when a force of magnitude $F_5$ is applied on the force sensors 122a and 122b on the first edge 112 of the electronic device 100. In this example, each one of the first and second graphical buttons 252a and 252b has its corresponding input confidence functions 260.

In this case, the processor 130 determines input confidences $c_5$ and $c_6$ using each of the input confidence functions 260 based on a location of the force of magnitude $F_5$. In this example, the processor 130 moves the first edge portion 242 where the force is received. In this embodiment, the destination position $d_5$ is calculated based on the amplitude $f_5$ of the first measured value received in a manner similar than described above. However, the width $w_5$ is determined based on a maximal $c_{max}$ of the input confidences $c_5$ and $c_6$, i.e. $c_{max} = \max(c_5, c_6) = c_5$. For instance, in the illustrated example, the input confidence $c_5$ is 0 while the input confidence $c_6$ is greater than 0. Accordingly, the width $w_5$ is calculated based on the input confidence $c_5$, and not based on the input confidence $c_6$. Accordingly, the width $w_5$ is given by $w_5 = B \cdot c_5 + C$. Although a maximizing function is used in this embodiment, alternatively the width $w_5$ can be determined by summing the input confidence $c_5$ and $c_6$, averaging the input confidences $c_5$ and $c_6$, etc.

In the embodiments of FIGS. 3-6, the processor 130 moves the first edge portion 242 at a given location which coincides with the location of the first input. However, in practice, the user may grip the electronic device 100 and apply forces on force sensors 122 at different locations of the electronic device 100 in doing so.

Figure 7A:
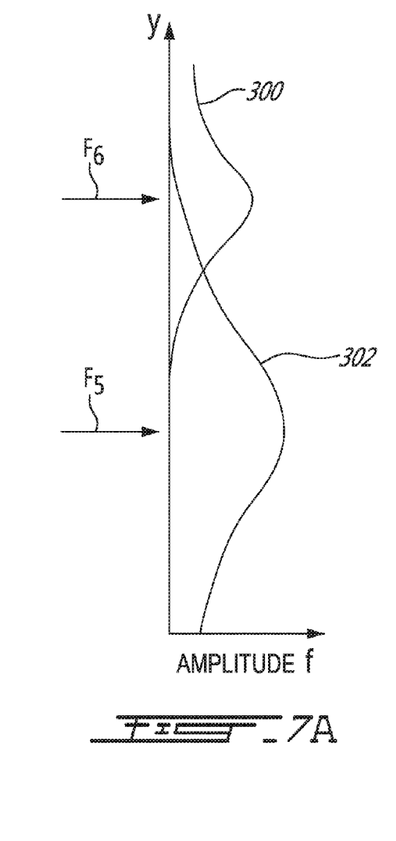
FIGS. 7A-B are graphs showing the first measured values received from corresponding force sensors of the electronic device of FIG. 1 when forces of magnitude $F_5$ and $F_6$ are applied simultaneously on its first edge, in accordance with an embodiment.

For instance, FIG. 7A shows a graph plotting the amplitude of the first measured values received from the force sensors 122a and 122b on the first edge 112 of the electronic device as function of their corresponding locations. As can be seen, first curve 300 can be associated with forces applied by a user's index finger (see force of magnitude $F_6$ shown in dashed line in FIG. 7) while second curve 302 can be associated with forces applied by a user's middle finger (see force of magnitude $F_5$ in FIG. 7).

Figure 7B:
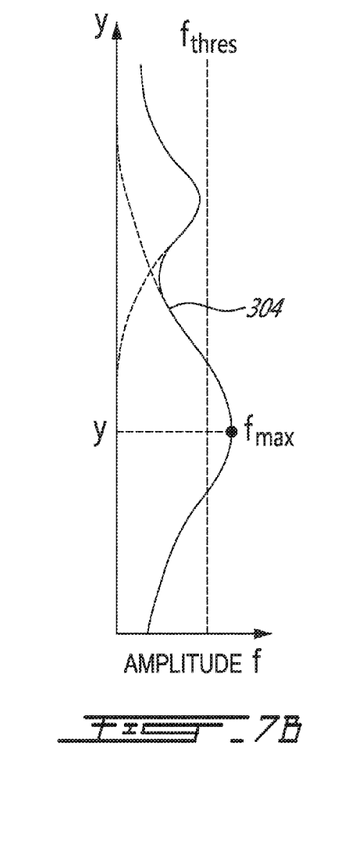

After having received the first measured values shown in FIG. 7A, the processor 130 can combine these data to obtain a net deformation curve 304 such as the one shown in FIG. 7B. In some embodiments, the processor 130 modifies the graphical user interface based on a maximal one of the amplitudes f of the first measured values, the maximal amplitude $f_{max}$, and moves the first edge portion 242 at a location of the maximal amplitude $f_{max}$, as shown in FIG. 7 for example. In some cases, if the maximal amplitude $f_{max}$ of the first measured values fails to exceed a corresponding amplitude threshold $f_{thres}$, the processor 130 ignores the first measured values and do not modify the graphical user interface accordingly.

Figure 8:
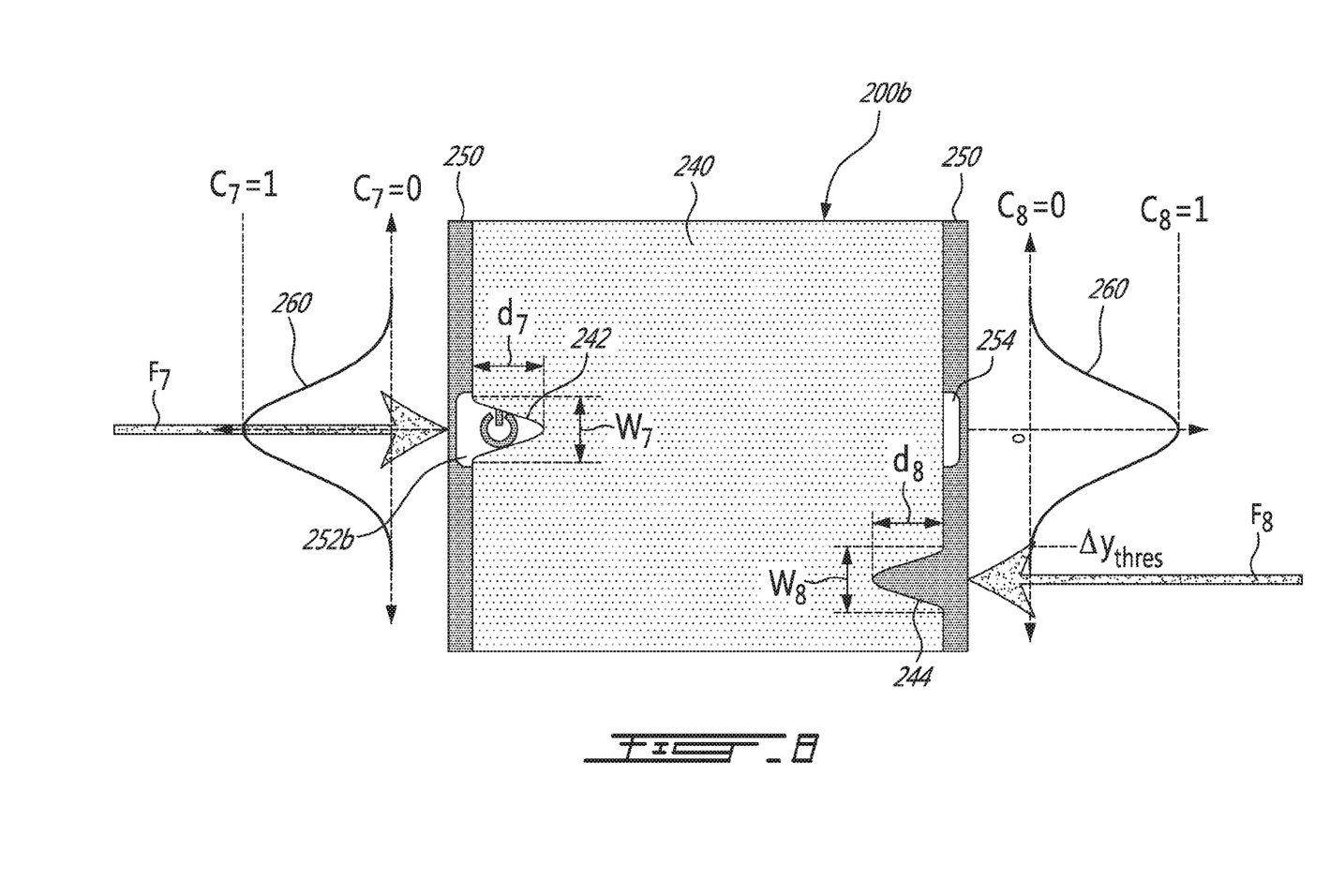
FIG. 8 is a schematic view of a second portion of the graphical user interface of FIG. 2 when opposite forces of magnitudes $F_7$ and $F_8$ are applied on both edges of the electronic device of FIG. 1, in accordance with an embodiment.

FIG. 8 shows an enlarged view of a second portion 200b of the graphical user interface 200 of FIG. 2 when two opposite forces of magnitudes $F_7$ and $F_8$ are applied simultaneously on the first and second edges 112 and 114.

Indeed, in some embodiments, some functions can be activated by applying multiple forces simultaneously at different locations of the electronic device 100 (e.g., by multiple fingers or thumb such as shown in FIG. 1). For example, a function associated with the second and third graphical buttons 252b and 254 of the graphical user interface 200 can be activated by applying forces on their corresponding locations. In this example, in response to applying forces on the second and third graphical buttons 252b and 254, the processor 130 activates a power on/off request. Accordingly, in this specific case, the second graphical button 252b is a power icon which is generally associated with a power function of the electronic device. Other function can be activated in this way in other embodiments.

A deformation can be displayed for each force applied on the force sensors 122 of the electronic device 100. The destination position d7 of the first edge portion 242 and the destination position d8 of the second edge portion 244 can be determined in a manner similar to that described above. However, in this example, the width w7 of the first edge portion 242 and the width w8 of the second edge portion 244 are determined using an aggregate input confidence c' determined based on all forces applied, as follows.

As shown, for each graphical button 252b, 254, a corresponding input confidence function 260 is defined. Given the locations of the two forces applied on the first and second edges 112 and 114 of the electronic device 100, an input confidence may be determined using each input confidence function 260, to arrive at input confidences $c_7$ and $c_8$.

In the illustrated example, the input confidence $c_7$ is maximal, e.g., equal to 1, because the location of the force of magnitude $F_7$ corresponds to the expected input location of the second graphical button 252b. In contrast, the input confidence $c_8$ is minimal, e.g., equal to 0, because the location of the force of magnitude $F_8$ is beyond the location offset threshold $y_{thres}$. The aggregate input confidence c' is the product of $c_7$ and $c_8$, which yields 0, i.e. $c_7 \times c_8 = 0$. According to equation (2) above, the width $w_7$ of the first edge portion 242 and the width $w_8$ of the second edge portion 244 thus correspond to the minimum deformation width C.

Figure 9:
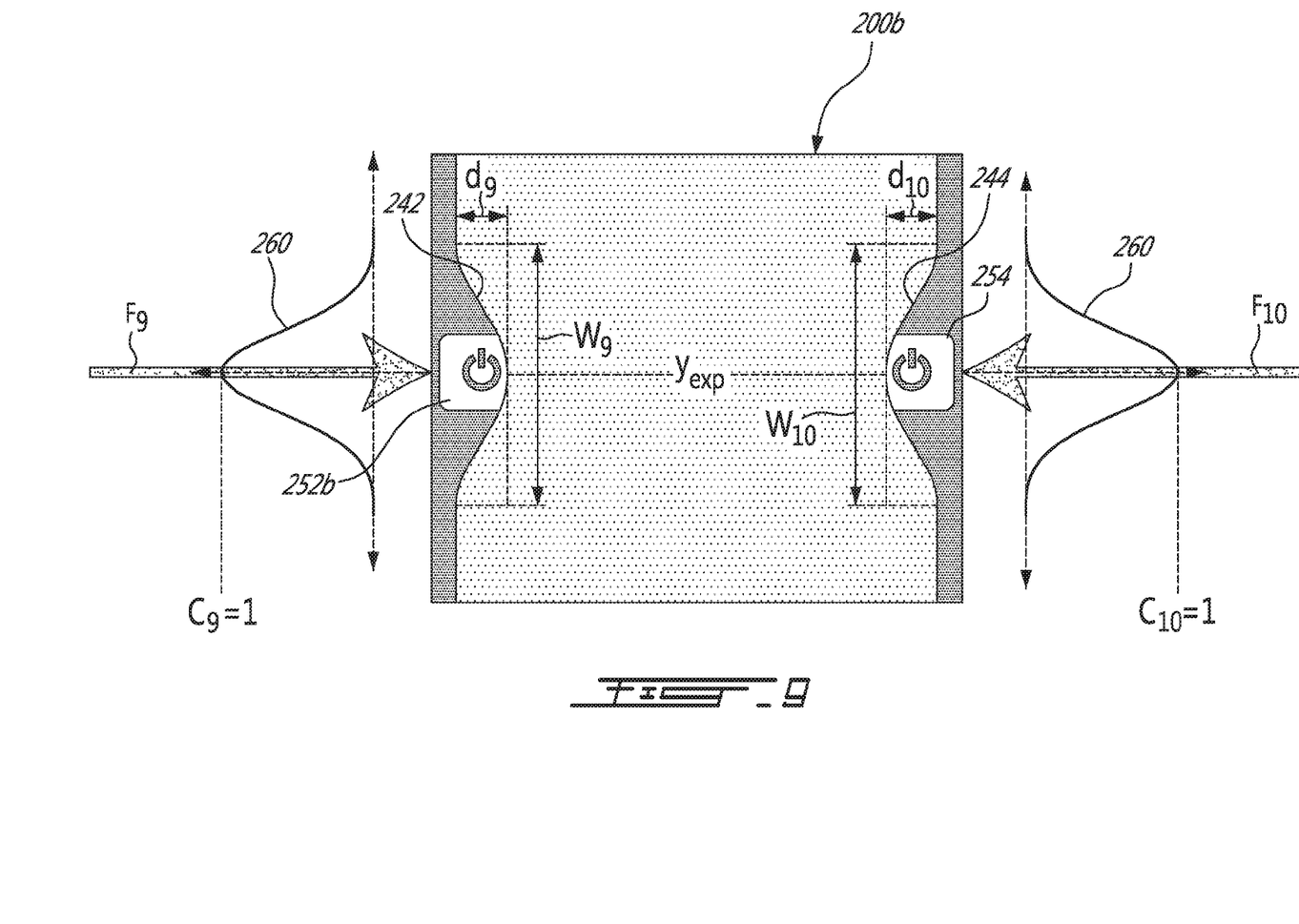
FIG. 9 is a schematic view of the second portion of the graphical user interface of FIG. 2 when two opposite forces of magnitudes $F_9$ and $F_{10}$ are applied on both edges of the electronic device of FIG. 1, in accordance with an embodiment.

FIG. 9 shows an enlarged view of the second portion 200b of the graphical user interface 200 of FIG. 2 when two opposite forces of magnitudes $F_9$ and $F_{10}$ are applied simultaneously on the first and second edges 112 and 114.

Still in this example, a deformation is displayed for each force applied on the force sensors 122 of the electronic device 100. The destination position $d_9$ of the first edge portion 242 and the destination position $d_{10}$ of the second edge portion 244 can be determined in a manner similar to that described above. The width $w_9$ of the first edge portion 242 and the width $w_{10}$ of the second edge portion 244 are determined based on the aggregate input confidence c' as described above.

Given the locations of the two forces applied on the first and second edges 112 and 114 of the electronic device 100, an input confidence is determined using each input confidence function 260, to arrive at input confidences $c_9$ and $c_{10}$.

In the illustrated example, both the input confidences $c_9$ and $c_{10}$ are maximal, e.g., equal to 1, because the location of the forces of magnitudes $F_9$ and $F_{10}$ corresponds to the expected input locations $y_{exp}$ associated with the first graphical button 252b and the third graphical button 254. The aggregate input confidence c' is the product of $c_9$ and $c_{10}$ which yields 1, i.e. $c_9 \times c_{10}=1$. According to equation (2) above, the width $w_9$ of the first edge portion 242 and the width $w_{10}$ of the second edge portion 244 are both maximal, which reveals both the first and third graphical buttons 252a and 254.

Figure 10:
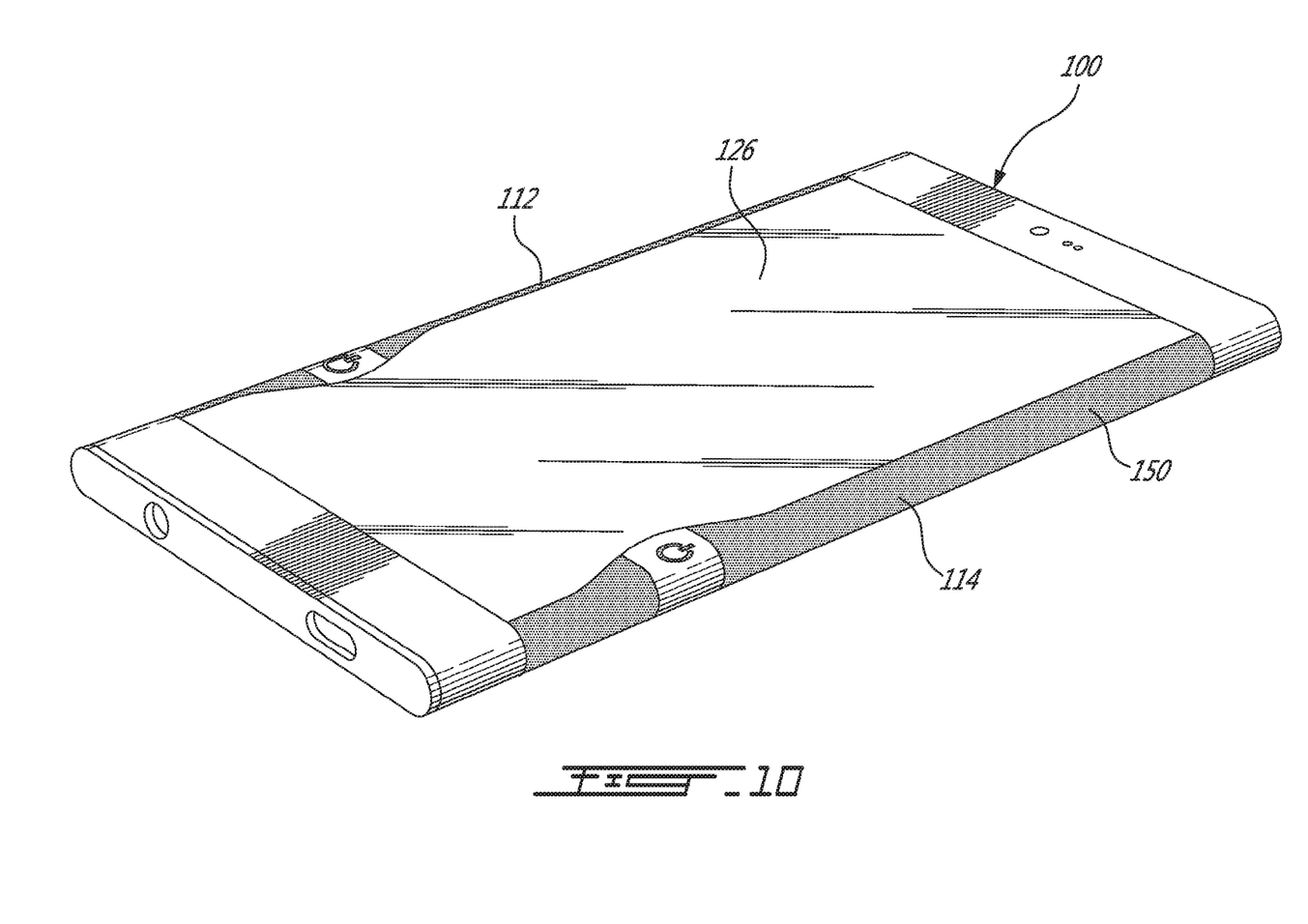
FIG. 10 is a perspective view of the electronic device of FIG. 1, showing the graphical user interface displayed when the two opposite forces of magnitudes $F_9$ and $F_{10}$ are applied on its both edges, in accordance with an embodiment.

FIG. 10 shows a perspective view of the electronic device 100 with a graphical user interface including a deformable element in a deformed state, as the one shown in FIG. 9. As depicted, the first and second edges 112 and 114 are curved and the display screen 126 is curved so as to the curved edges 112 and 114. In this embodiment, it is intended that the background graphical element 150 can be displayed at least partially on the curved portions of the first and second edges 112 and 114. However, it is understood that, in some other embodiments, the electronic device can have squared edges and a flat screen extending towards the squared edges.

As can be understood, the examples described above and illustrated are intended to be exemplary only. It is noted that the modification of the edge portion of the foreground graphical element can include animating the edge portion during its modification from a first state to a second state. Is it intended that the animation of the edge portion can be performed while the foreground graphical element displays an image or a video. The scope is indicated by the appended claims.

What is claimed is:

1. A computer-implemented method of operating an electronic device having a housing and a user interface mounted to the housing, the user interface including at least one force sensor on a first edge of two opposite edges of the housing and a display screen, the computer-implemented method comprising:

displaying, on the display screen, a foreground graphical element having a first edge portion, and a background graphical element protruding from the first edge portion of the foreground graphical element;

receiving a first input from the at least one force sensor on the first edge, the first input being a first measured value of a force applied on the at least one force sensor on the first edge; and in response to said first input received, modifying the foreground graphical element on the display screen in a manner to move, to a destination position, the first edge portion of the foreground graphical element and thereby one of reveal and hide a first corresponding portion of the background graphical element, depending on a direction of movement of the first edge portion, a distance between the destination position of the first edge portion and the first edge of the housing of the electronic device varying with respect to an amplitude of the first measured value, wherein the movement of the first edge portion includes changing a shape of the first edge portion between a relaxed state and a stressed state in a manner resembling a shape of a real-world material receiving the force.

2. The computer-implemented method of claim 1 wherein the destination position of the first edge portion reaches a maximal recessed destination position when the amplitude of the first measured value exceeds a given amplitude threshold.

3. The computer-implemented method of claim 2 further comprising activating a target function of the electronic device when the amplitude of the first measured value exceeds the given amplitude threshold.

4. The computer-implemented method of claim 1 wherein the first edge portion of the foreground graphical element moves away from the first edge of the housing when the amplitude of the first measured value increases.

5. The computer-implemented method of claim 1 wherein the first corresponding portion of the background graphical element includes a graphical button associated with a target function.

6. The computer-implemented method of claim 1 wherein the user interface includes a plurality of force sensors having associated locations along the first edge, said receiving including receiving a plurality of first inputs from the plurality of force sensors on the first edge, the plurality of first inputs being a plurality of first measured values of one or more forces applied on a corresponding one of the plurality of force sensors on the first edge.

7. The computer-implemented method of claim 6 wherein the first edge portion has a width extending along the first edge and adjacent a location associated with a maximal one of the amplitudes of the plurality of first measured values.

8. The computer-implemented method of claim 7 further comprising determining a location offset between the location associated with the maximal one of the amplitude of the plurality of first measured values and a location of the graphical button.

9. The computer-implemented method of claim 8 wherein the width of the first edge portion increases when the location offset decreases and reaches a maximal width when the location offset is null.

10. The computer-implemented method of claim 1 wherein the user interface further includes at least one other force sensor on at least one of the first edge and a second edge of the two opposite edges of the housing and the foreground graphical element having a second edge portion adjacent to the at least one of the first edge and the second edge; further comprising receiving a second input from the at least one other force sensor on the at least one of the first edge and the second edge, the second input being a second measured value of a force applied on the at least one other force sensor on the at least one of the first edge and the second edge; and in response to said second input received, modifying the foreground graphical element on the display screen in a manner to move, to a destination position, the second edge portion of the foreground graphical element and thereby one of reveal and hide a second corresponding portion of the background graphical element, depending on a direction of movement of the second edge portion, a distance between the destination position of the second edge portion and the second edge of the housing of the electronic device varying with respect to an amplitude of the second measured value.

11. The computer-implemented method of claim 10 wherein the first edge portion is on the first edge and the second edge portion is on the second edge, the first edge portion and the second edge portion being transversally aligned with one another.

12. An electronic device comprising:
a housing having a first edge and a second edge opposite the first edge;
a user interface mounted to the housing, the user interface including at least one force sensor on the first edge of the housing and a display screen;
a processor housed within the housing and in communication with the user interface, the processor being configured to execute steps of:
displaying, on the display screen, a foreground graphical element having a first edge portion, and a background graphical element protruding from the first edge portion of the foreground graphical element;
receiving a first input from the at least one force sensor on the first edge, the first input being a first measured value of a force applied on the at least one force sensor on the first edge; and
in response to said first input received, modifying the foreground graphical element on the display screen in a manner to move, to a destination position, the first edge portion of the foreground graphical element and thereby one of reveal and hide a first corresponding portion of the background graphical element, depending on a direction of movement of the first edge portion, a distance between the destination position of the first edge portion and the first edge of the housing of the electronic device varying with respect to an amplitude of the first measured value, wherein the movement of the first edge portion includes changing a shape of the first edge portion between a relaxed state and a stressed state in a manner resembling a shape of a real-world material receiving the force.

13. A computer-implemented method of operating an electronic device having a housing and a user interface mounted to the housing, the user interface including at least one force sensor sensitive at different locations on a first edge of two opposite edges of the housing and a display screen, the computer-implemented method comprising:
displaying, on the display screen, a graphical element having a first edge portion;
receiving a first input from the at least one force sensor on the first edge, the first input being a first measured value of one or more forces applied on the at least one force sensor on the first edge; and
in response to said first input received, modifying the graphical element on the display screen in a manner to move, to a destination position, the first edge portion depending on an amplitude of the first measured value and on a first input confidence, a distance between the destination position of the first edge portion and the first edge of the housing of the electronic device varying with respect to the amplitude of the first measured value, the first input confidence being function of a first location offset between a location of the first input received and a first expected input location, wherein the movement of the first edge portion includes changing a shape of the first edge portion between a relaxed state and a stressed state in a manner resembling a shape of a real-world material receiving the force.

14. The computer-implemented method of claim 13 further comprising activating a target function of the electronic device when the amplitude of the first measured value exceeds a given amplitude threshold and when the first location offset is below a given location offset threshold.

15. The computer-implemented method of claim 13 wherein the user interface further includes at least one other force sensor on a second edge of the two opposite edges of the housing and the graphical element having a second edge portion adjacent to the second edge; further comprising receiving a second input from the at least one other force sensor on the second edge, the second input being a second measured value of one or more forces applied on the at least one other force sensor on the second edge; and in response to said second input received, modifying the graphical element on the display screen in a manner to move, to a destination position, the second edge portion depending on an amplitude of the second measured value and on a second input confidence, a distance between the destination position of the second edge portion and the second edge of the housing of the electronic device varying with respect to the amplitude of the second measured value, the second input confidence being function of a location offset between a location of the second input received an a second expected input location.

16. The computer-implemented method of claim 15 wherein the first edge portion and the second edge portion have a corresponding width, the corresponding width being function of an aggregate input confidence based on a multiplication of the first and second input confidences to one another.

* * * * *